Figure 2:
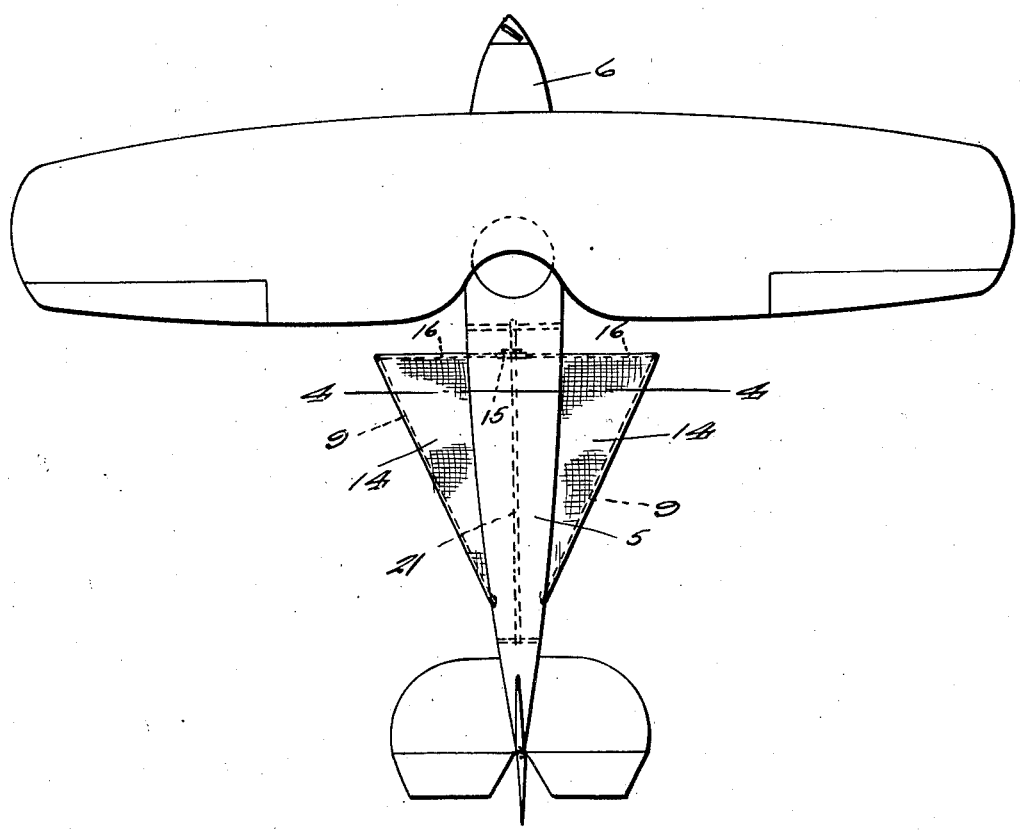

Oct. 21, 1930.    M. B. COWART    1,778,753
AEROPLANE BRAKE
Filed Aug. 20, 1929    5 Sheets-Sheet 1
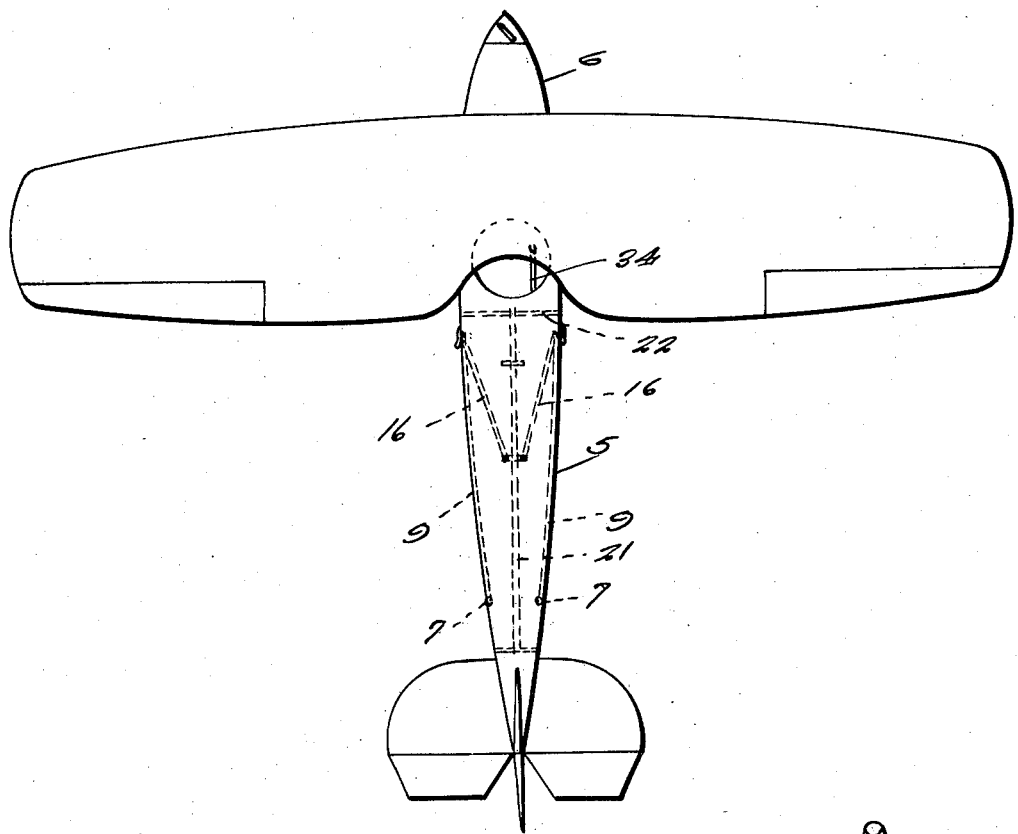
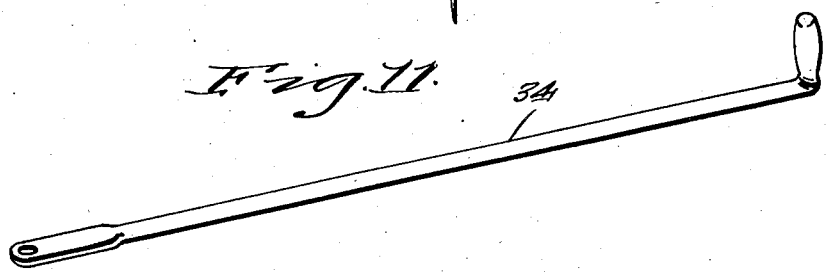
Inventor
Marion B. Cowart
By Clarence A. O'Brien
Attorney Oct. 21, 1930. M. B. COWART 1,778,753
AEROPLANE BRAKE
Filed Aug. 20, 1929   5 Sheets-Sheet 2

Inventor
Marion B. Cowart

By Clarence A. O'Brien
Attorney

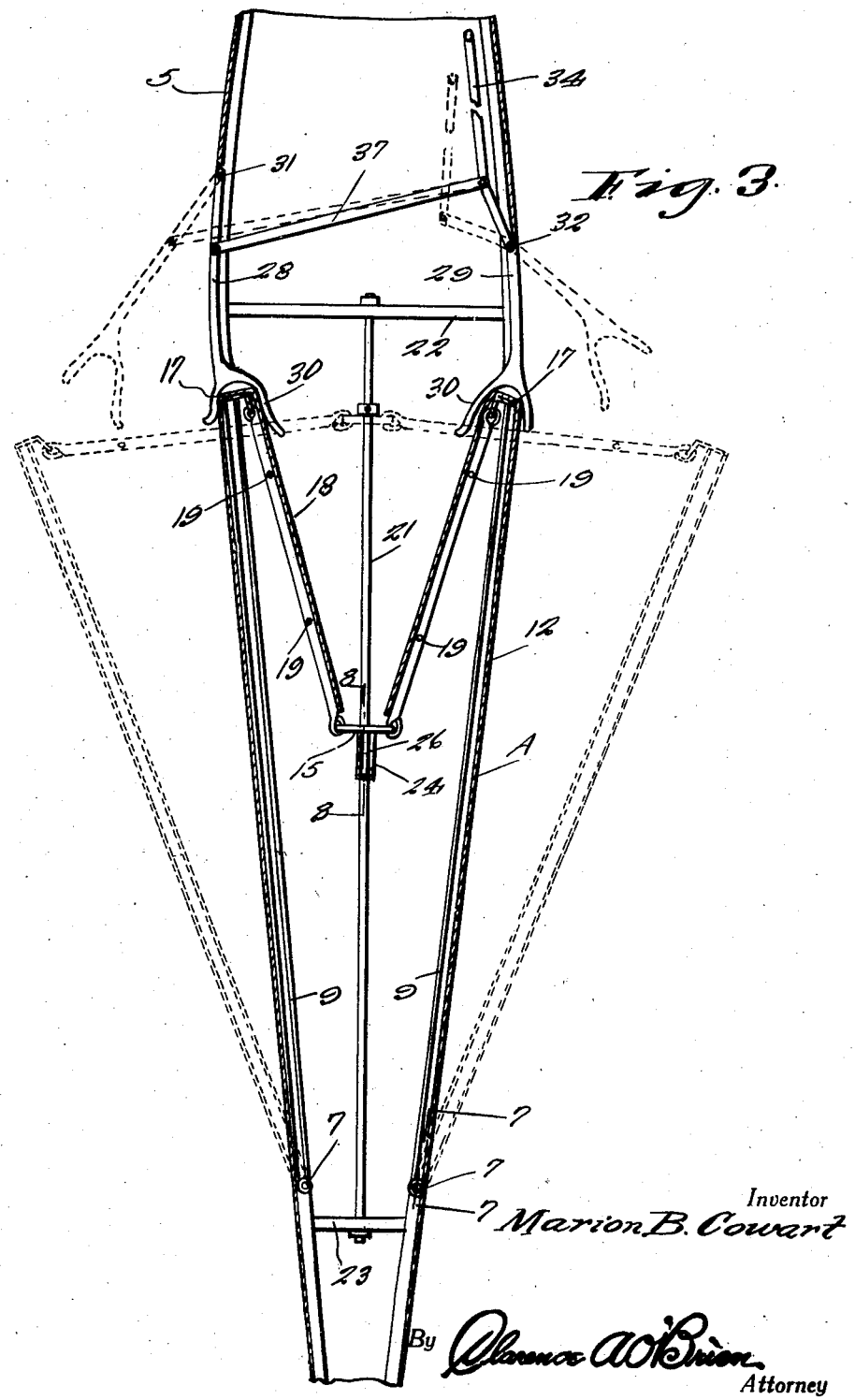

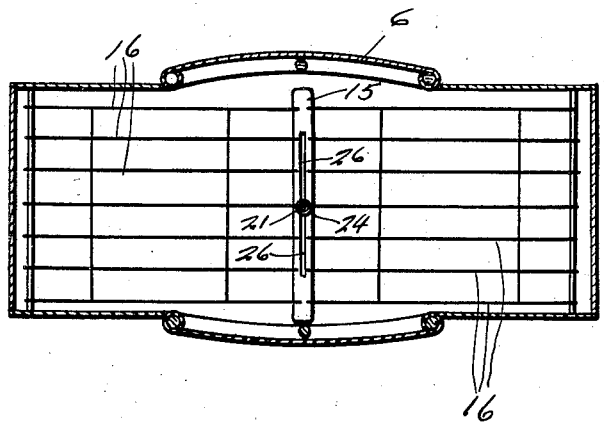
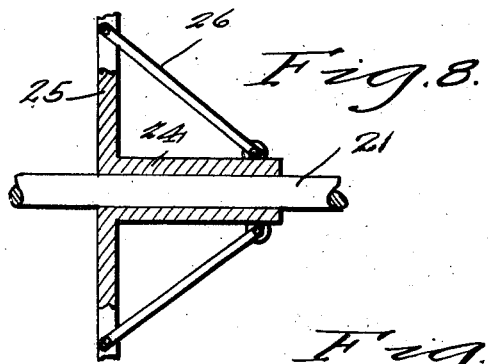
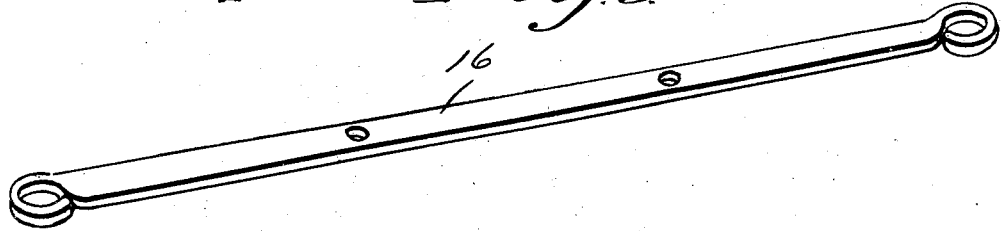
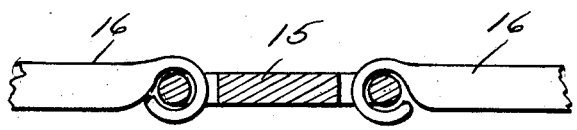

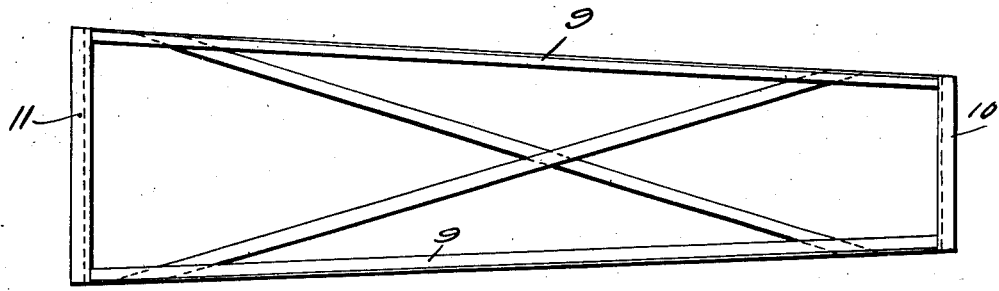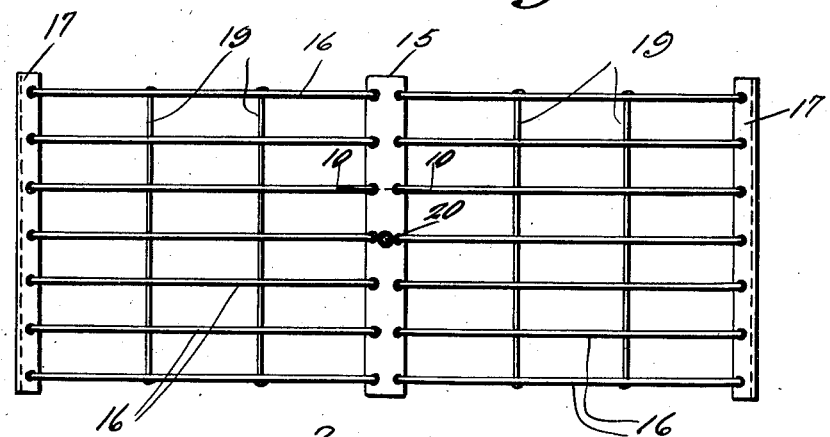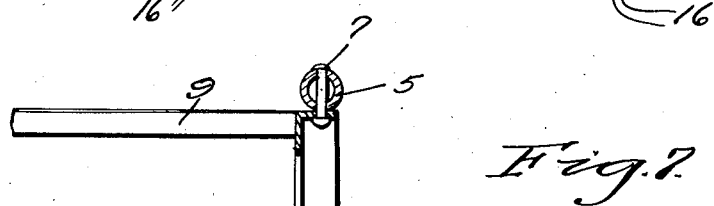

Patented Oct. 21, 1930

1,778,753

UNITED STATES PATENT OFFICE

MARION B. COWART, OF TAMPA, FLORIDA

AEROPLANE BRAKE

Application filed August 20, 1929. Serial No. 387,118.

The present invention relates to aeroplanes generally and more particularly to a brake mechanism associated therewith whereby the aeroplane may be slowed down in the air particularly for the purpose of making a landing in a relatively short area.

An important object of the invention resides in the provision of a brake mechanism incorporated in the rear portion of the fuselage and comprising sections which are movable outwardly from the fuselage to set up a relatively great air resistance surface to retard the aeroplane enabling the same to land safely and expeditiously in a relatively small area.

Another very important object of the invention resides in the provision of a braking mechanism of this nature which may be released to an active position in an easy manner by the aviator.

A still further very important object of the invention resides in the provision of an aeroplane braking mechanism of this nature which is simple in its construction, inexpensive to incorporate in an aeroplane, strong and durable, thoroughly efficient and reliable in use and operation, compact and convenient in its arrangement of parts, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 12:
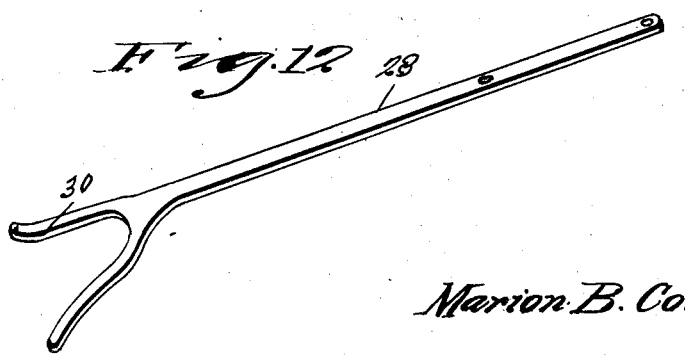

In the drawing:

Figure 1 is a top plan view of an aeroplane with my brake mechanism incorporated therein in a retracted position, Figure 2 is a similar view showing the mechanism in an extended position, Figure 3 is a longitudinal horizontal section therethrough, Figure 4 is a sectional view taken substantially on the line 4—4 of Figure 2, Figure 5 is a detail elevation of one of the side frames, Figure 6 is a detail elevation of the link frame, Figure 7 is an enlarged detail section taken substantially on the line 7—7 of Figure 3, Figure 8 is an enlarged detail section taken substantially on the line 8—8 of Figure 3, Figure 9 is a perspective view of one of the link bars, Figure 10 is an enlarged detail section taken substantially on the line 10—10 of Figure 6, Figure 11 is an enlarged detail perspective view of the operating handle, and Figure 12 is a perspective view of one of the releasing fork levers.

Referring to the drawings in detail it will be seen that the tail portion 5 of the fuselage 6 is provided with elongated side openings which are mounted at their rear ends as at 7 on the side members A.

Each side member A comprises a frame with longitudinal rearward converging bars 9, a rear bar 10 through which the pivot 7 extends and front bar 11.

The side frame is covered with canvas of like material 12 and canvas flaps 14 of triangular formation are connected with the side edges of the openings in the sides of the tail of the fuselage and with the bars 9.

Link frames comprise a central vertical bar 15 with link bars 16 engaged therewith. The outer ends of the link bars 16 are engaged with a pair of bars 17 connected with the forward ends of the side frames. These link frames are covered with canvas or suitable material 18.

The link bars 16 have rods 19 extending transversely therethrough for bracing purposes. The bar 15 is provided with a central opening 20. A rod 21 is mounted longitudinally in the tail 5 by means of cross supports 22 and 23 and is braced by extending through a stop sleeve 24 formed integrally with a vertical brace 25 in the tail of the fuselage.

The rear end of the sleeve 24 has brace rods 26 connected thereto which are also connected with the brace 25. Normally the parts are disposed as clearly shown in full lines in Figure 3 with the bars 15 disposed against the stop sleeve 24 and the vertical brace 25 and the sides A filling the side openings of the tail.

Levers 28 and 29 are formed at their rear ends with forks 30 receiving the forward ends of the sides A. The bar 28 is pivoted at its forward end as at 31 in a side slot in the fuselage 5. Lever 29 is pivoted intermediate its ends as at 32 in another side slot in the fuselage 5. A link 37 is pivotally connected with an intermediate portion of the lever 28 and the rear end portion of the lever 29.

A handle 34 is connected with the pivot between the link 37 and the lever 29. It will therefore be seen that by pushing this handle 34 rearwardly the forked levers 28 and 29 may be moved out to the dotted line position shown in Figure 3 and in being so moved out they will also move out the sides A to the dotted line position shown in Figure 3 causing the bar 15 to slide forwardly on the rod 21 and the link frames to take the dotted line position shown in Figure 3 thereby presenting a relatively large resisting area to the air and braking the speed of the aeroplane so that it may land safely, and expeditiously in a relatively small area on the ground whenever this is necessary.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advance enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with the fuselage of an aeroplane provided with side openings, of side members hingedly mounted at their rear ends in the rear end of the opening, and means for swinging the forward ends of the sides outwardly, link members pivotally connected with the forward ends of the side members, a bar to which the link members are connected, a rod mounted longitudinally in the fuselage and extending through an opening in the bar so that the bar may slide thereon, means for moving the forward ends of the sides outwardly comprising a pair of levers pivotally mounted in the fuselage and having forked ends receiving the forward ends of the sides, and means for rocking the levers to move the forked ends outwardly with the forward ends of the sides.

2. In combination with the fuselage of an aeroplane provided with side openings, of side members hingedly mounted at their rear ends in the rear end of the opening, and means for swinging the forward ends of the sides outwardly, link members pivotally connected with the forward ends of the side members, a bar to which the link members are connected, a rod mounted longitudinally in the fuselage and extending through an opening in the bar so that the bar may slide thereon, means for moving the forward ends of the sides outwardly comprising a pair of levers pivotally mounted in the fuselage and having forked ends receiving the forward ends of the sides, and means for rocking the levers to move the forked ends outwardly with the forward ends of the sides, each side member comprising a frame covered with sheet material and having wings extending therefrom and connected with the sides of the openings.

3. In combination with the fuselage of an aeroplane provided with side openings, of side members hingedly mounted at their rear ends in the rear end of the opening, and means for swinging the forward ends of the sides outwardly, link members pivotally connected with the forward ends of the side members, a bar to which the link members are connected, a rod mounted longitudinally in the fuselage and extending through an opening in the bar so that the bar may slide thereon, means for moving the forward ends of the sides outwardly comprising a pair of levers pivotally mounted in the fuselage and having forked ends receiving the forward ends of the sides, and means for rocking the levers to move the forked ends outwardly with the forward ends of the sides, each side member comprising a frame covered with sheet material and having wings extending therefrom and connected with the sides of the openings, said wings being of triangular formation.

4. In combination with the fuselage of an aeroplane provided with side openings, of side members hingedly mounted at their rear ends in the rear end of the opening, and means for swinging the forward ends of the sides outwardly, link members pivotally connected with the forward ends of the side members, a bar to which the link members are connected, a rod mounted longitudinally in the fuselage and extending through an opening in the bar so that the bar may slide thereon, means for moving the forward ends of the sides outwardly comprising a pair of levers pivotally mounted in the fuselage and having forked ends receiving the forward ends of the sides, and means for rocking the levers to move the forked ends outwardly with the forward ends of the sides, each side member comprising a frame covered with sheet material and having wings extending therefrom and connected with the sides of the openings, said wings being of triangular formation, said links comprising a plurality of bars covered with canvas.

In testimony whereof I affix my signature.

MARION B. COWART.